US011669949B2

(12) United States Patent
Guyduy et al.

(10) Patent No.: US 11,669,949 B2
(45) Date of Patent: Jun. 6, 2023

(54) APPARATUS AND METHOD FOR INFERRING CONTRAST SCORE OF AN IMAGE

(71) Applicant: Canon U.S.A., Inc., Melville, NY (US)

(72) Inventors: Yevgeniy Gennadiy Guyduy, Bellmore, NY (US); Tyler James Shaw, Bay Shore, NY (US)

(73) Assignees: Canon U.S.A., Inc., Melville, NY (US); Canon Kabushiki Kaisha, Tokyo (JP)

( * ) Notice: Subject to any disclaimer, the term of this patent is extended or adjusted under 35 U.S.C. 154(b) by 227 days.

(21) Appl. No.: 17/076,391

(22) Filed: Oct. 21, 2020

(65) Prior Publication Data
US 2021/0118122 A1    Apr. 22, 2021

Related U.S. Application Data

(60) Provisional application No. 62/924,518, filed on Oct. 22, 2019.

(51) Int. Cl.
G06K 9/00      (2022.01)
G06T 7/00      (2017.01)
G06N 5/04      (2023.01)
G06N 7/01      (2023.01)
G06V 10/764    (2022.01)
G06V 10/82     (2022.01)

(52) U.S. Cl.
CPC ............ *G06T 7/0002* (2013.01); *G06N 5/04* (2013.01); *G06N 7/01* (2023.01); *G06V 10/764* (2022.01); *G06V 10/82* (2022.01); *G06T 2207/20076* (2013.01); *G06T 2207/20081* (2013.01); *G06T 2207/30168* (2013.01)

(58) Field of Classification Search
CPC ......... G06T 7/0002; G06T 2207/20076; G06T 2207/20081; G06T 2207/30168; G06N 5/04; G06N 7/005
USPC .......................................................... 382/159
See application file for complete search history.

(56) References Cited

U.S. PATENT DOCUMENTS

2008/0226148 A1*  9/2008  Gu ........................ G06T 7/0002
                                                      382/128

OTHER PUBLICATIONS

Chambah, Majed, et al. "Toward an automatic subjective image quality assessment system." Image Quality and System Performance VI. vol. 7242. SPIE, 2009. (Year: 2009).*

(Continued)

*Primary Examiner* — Jonathan S Lee
(74) *Attorney, Agent, or Firm* — Canon U.S.A., Inc., IP Division

(57) ABSTRACT

An apparatus for classifying a contrast level of an image is provided. One or more processors execute instructions stored in one or more memory devices which configure the one or more processors to obtain an image from an image source, extract intensity values for each pixel of the obtained image, calculate a probability distribution for the obtained image representing a number of pixels at each unique pixel value, determine, from the calculated probability distribution, a spread value representing a series pixel values including at least a predetermined number of pixels at each pixel value in the series of pixel values and classify the obtained image a member of one of three classes based on the calculated probability distribution and the determined spread value.

14 Claims, 12 Drawing Sheets

(56) References Cited

OTHER PUBLICATIONS

Tripathi, Abhishek Kumar, Sudipta Mukhopadhyay, and Ashis Kumar Dhara. "Performance metrics for image contrast." 2011 International Conference on Image Information Processing. IEEE, 2011. (Year: 2011).*

Vicario, Elena, et al. "P-19: Neural Network Based System for Assessing Image Quality." SID Symposium Digest of Technical Papers. vol. 34. No. 1. Oxford, UK: Blackwell Publishing Ltd, 2003. (Year: 2003).*

Abdoli, Mohsen, et al. "Quality assessment tool for performance measurement of image contrast enhancement methods." IET Image Processing 13.5 (2019): 833-842. (Year: 2019).*

* cited by examiner

- Michelson $$C = \frac{L_{max} - L_{min}}{L_{max} + L_{min}}$$

- Michelson (soft)

$$C = \frac{L_{0.97} - L_{0.03}}{L_{0.97} + L_{0.03}}$$

- Max difference to max possible difference $$C = \frac{L_{max} - L_{min}}{256}$$

- Max difference to max possible difference (soft)

$$C = \frac{L_{0.97} - L_{0.03}}{256}$$

- Root Mean Squared (calculated in the range [0,1])

$$C = \sqrt{\frac{1}{M*N} \sum_{i=1}^{N} \sum_{j=1}^{M} (L_{ij} - L_{mean})^2}$$

- Mean Absolute (calculated in the range [0,1])

$$C = \frac{1}{M*N} \sum_{i=1}^{N} \sum_{j=1}^{M} |L_{ij} - L_{mean}|$$

Fig. 1
PRIOR ART

MODEL

```
In [62]:  1
          2  # Instantiate the XGBClassifier: xg_cl
          3  xg_cl = xgb.XGBClassifier(base_score=0.5, booster='gbtree', colsample_bylevel=1,
          4              colsample_bynode=1, colsample_bytree=1, gamma=0,
          5              learning_rate=0.33119646830147397, max_delta_step=4, max_depth=5,
          6              min_child_weight=1, missing=None, n_estimators=82, n_jobs=1,
          7              nthread=None, objective='multi:softprob', random_state=0,
          8              reg_alpha=0, reg_lambda=1, scale_pos_weight=1, seed=None,
          9              silent=None, subsample=0.9, verbosity=1)
         10
```

Fig. 5A

APPARATUS AND METHOD FOR INFERRING CONTRAST SCORE OF AN IMAGE

CROSS-REFERENCE TO RELATED APPLICATIONS

This is a nonprovisional patent application that claims the benefit of U.S. Provisional Patent Application Ser. No. 62/924,518 filed on Oct. 22, 2019, the entirety of which is incorporated herein by reference.

BACKGROUND

The present disclosure relates to image processing and, more specifically, to evaluating areas of an image for a particular characteristic.

DESCRIPTION OF RELATED ART

Known techniques exist for identifying areas of an image that should undergo further image processing. One type of image processing is determining a contrast level in the captured image and scoring the contrast level in the image being evaluated. FIG. 1 illustrates different known methodologies for evaluating contrast in an image. These include Michelson contrast, RMS contrast and Weber contrast. The main drawback associated with these contrast evaluation methods illustrated in FIG. 1 is that they merely see to measure the difference between the darkest and lightest values in any given image. However these methodologies did not show good separation of contrast classes because current methodologies seek to measure the difference between the darkest and lightest value of the image and not an overall contrast of a given image. A system according to the present disclosure remedies these drawbacks by providing a way to evaluate the overall contrast level of an image.

SUMMARY

According to the present disclosure, a method and apparatus for classifying a contrast level of an image is provided. One or more processors execute instructions stored in one or more memory devices which configure the one or more processors to obtain an image from an image source, extract intensity values for each pixel of the obtained image, calculate a probability distribution for the obtained image representing a number of pixels at each unique pixel value, determine, from the calculated probability distribution, a spread value representing a series pixel values including at least a predetermined number of pixels at each pixel value in the series of pixel values and classify the obtained image a member of one of three classes based on the calculated probability distribution and the determined spread value.

According to another embodiment, the one or more processors are configured to determine a number of channels within the obtained image, and wherein the probility distribution is calculated using pixels values in each of the determined number of channels. In a further embodiment, in a case where the determined number of channels is greater than a predetermined number of channels, a luminance value for each pixel at each of the determined number of channels is determined.

According to a further embodiment, the one or more processors are configured to scale the determined spread value to represent a precentage of pixel values among all possible pixel values within the spread and generate a data frame including the probability distribution and the scaled spread value.

In a further embodiment, classifying the obtained image further includes generating a data frame including the calculated probability distribution and the determined spread value, providing the generated data frame to a trained machine learning model trained to predict, based on the generated data frame, which one of the three classes the image belongs, and generating, for each of the three classes, a likelihood value representing a likelihood that the obtained image belongs in that class and classifying the obtained image in one of the three classes based on the likelihood value meeting a predetermined threshold. In certain embodiments, classifying the obtained image includes classifying the obtained image in a first class when a likelihood value for the first class is greater than a likelihood value for each of the second and third classes, classifying the obtained image in a second class when a likelihood value for the second class is greater than a likelihood value for each of the first class and the third class; and classifying the obtained image in the third class in all other instances. In this embodiment, the first class represents an image having a high degree of contrast, the second class represents an image having a low degree contrast, and the third class represents an image having a normal degree contrast.

These and other objects, features, and advantages of the present disclosure will become apparent upon reading the following detailed description of exemplary embodiments of the present disclosure, when taken in conjunction with the appended drawings, and provided claims.

BRIEF DESCRIPTION OF THE DRAWINGS

FIG. 1 depicts prior art contrast scoring algorithms.

FIGS. 5A-5D illustrate parameter used in creating a trained machine learning model for evaluating image contrast.

Figure 2:
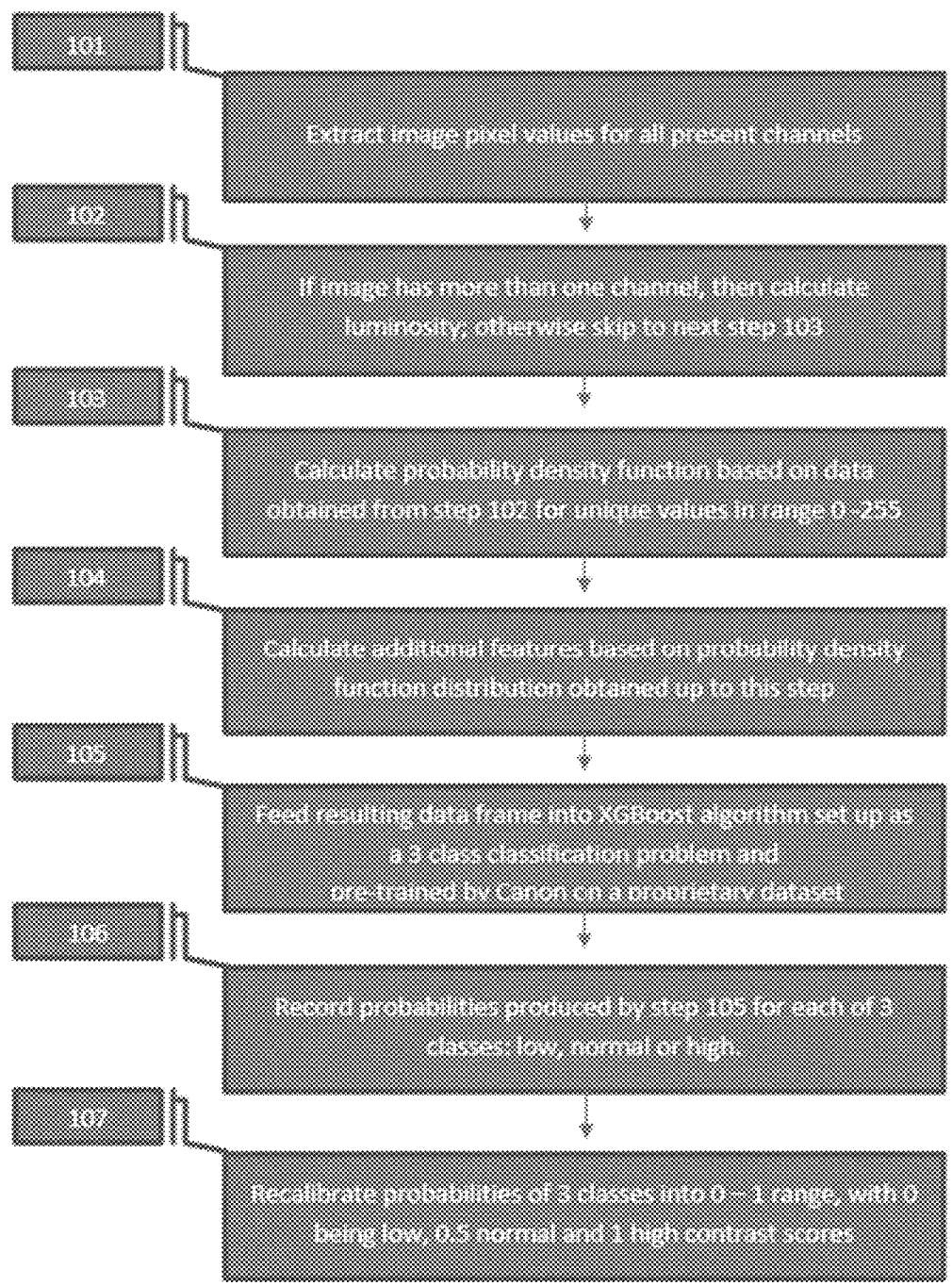
FIG. 2 illustrates an exemplary algorithm for evaluating image contrast according to the present disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION

Exemplary embodiments of the present disclosure will be described in detail below with reference to the accompanying drawings. It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment and, according to the Figures and embodiments described below, embodiments described can be applied/performed in situations other than the situations described below as examples.

The present disclosure provides an apparatus and method that utilizes a trained machine learning algorithm for inferring an overall contrast score of an image. This algorithm provides an improved ability to classify an image according to the contrast levels presented therein. In other words, the algorithm analyzes the image and assigns a constrast score to the image as being a member of one of three classes. In one embodiment, the three classes represent a high contrast image, a low contrast image and a normal contast image. To accomplish this a trained machine learning model is used. Exemplary types of machine learning models that are trained and used as part of the algorithm include, but is not limited to, a neural network or a connvolutional neural network (CNN). These are merely exemplary and any machine learning model that is structured to consider the below described characteristics may be used in the classification of images as discussed herein. The model structure is designed to consider the luminance values of each channel in the the image and the a spread value which represents a distance of contiguous pixels that have have non-zero luminance values. It has been found that there is an improved classification of the image in one of the three categories (high, low, normal) when considering weighted luminance values on one or more of the channels in the image (e.g. each of R, G, and B) and when the spread value is greater than or equal to a predetermined value. An example of the predictors used as characteristics representative of the three different classes into which images evaluated by the trained model will be described below with respect to FIGS. 5A-5D.

The apparatus and method according to the present disclosure improves the ability to accurately determine a correct level of contrast in an image and classify it into the correct class (e.g. high, low, normal contrast) with a higher degree of reliability as will be discussed below in FIGS. 6A and 6B. The improved ability to automatically classify an image according to contrast level improves over the manual identification of contrast in photos that vary based on known methodologies selected for this evaluation because the manual identification is highly dependent on individual's judgment. The subjective nature of manual contrast identification yields inconsistencies in contrast grades. Additionally, the manual identification is time-consuming process when the data set to be evaluated numbers in the thousands of images. As such, the present disclosure improves the technical evaluation of image elements by providing systematic approach of scoring overall image contrast in which the ultimate classification has a higher degree of likelihood of it being correct. Further, the systematic approach to scoring images for overall contrast score advantageously standardizes the contrast score output so that it can be used as an input to other downstream image processing/analysis systems.

The improved contrast scoring algorithm is shown in FIG. 2. In Step 101, one or more images are obtained and, for each obtained image, processed into a list of raw pixel values for the respective image. In one embodiment, the processing into raw pixel values may include extracting intensity values for each pixel in the obtained image. In Step 102, a number of input channels are identified. In the input images have one channel (black and white) the algorithm proceeds to Step 103. In a case that the number of input channels is greater than one channel, it is indicative that the input image is an red, green blue (RGB) image. In this instance, step 102 further includes calculating the luminosity as a dot product of 3 matrixes using predetermined weight values using the following formula provided in Equation 1:

$$L = R(w_i) + G(w_2) + B(w_3) \tag{Equation 1}$$

Where L represents luminosity and $w_1$, $w_2$, and $w_3$ represent channel weight values that are between 0 and 1. The channel weight values may be the same or different values. In one embodiment, a channel weight value for the R channel is a number between the channel weight value for the B and G channels. For example. The channel weight value for B may be a value lower than the channel weight for both R and G whereas the channel weight value for G may be greater than the channel weight value for both R and B. As such, step 102 includes determining a number of channels within the obtained image and calculating the probability distribution using the each pixel values in each of the determined number of channels.

In Step 103, a probability density function is utilized to calculate normalized distribution of pixel value and the resulting table is utilized to estimate fractions of pixels within each unique value ranging from 0 to 255. As such, instep 103, a probability distribution for the obtained image is calculated and it represents a number of pixels at each pixel value from 0-255 within the image.

Figure 4:
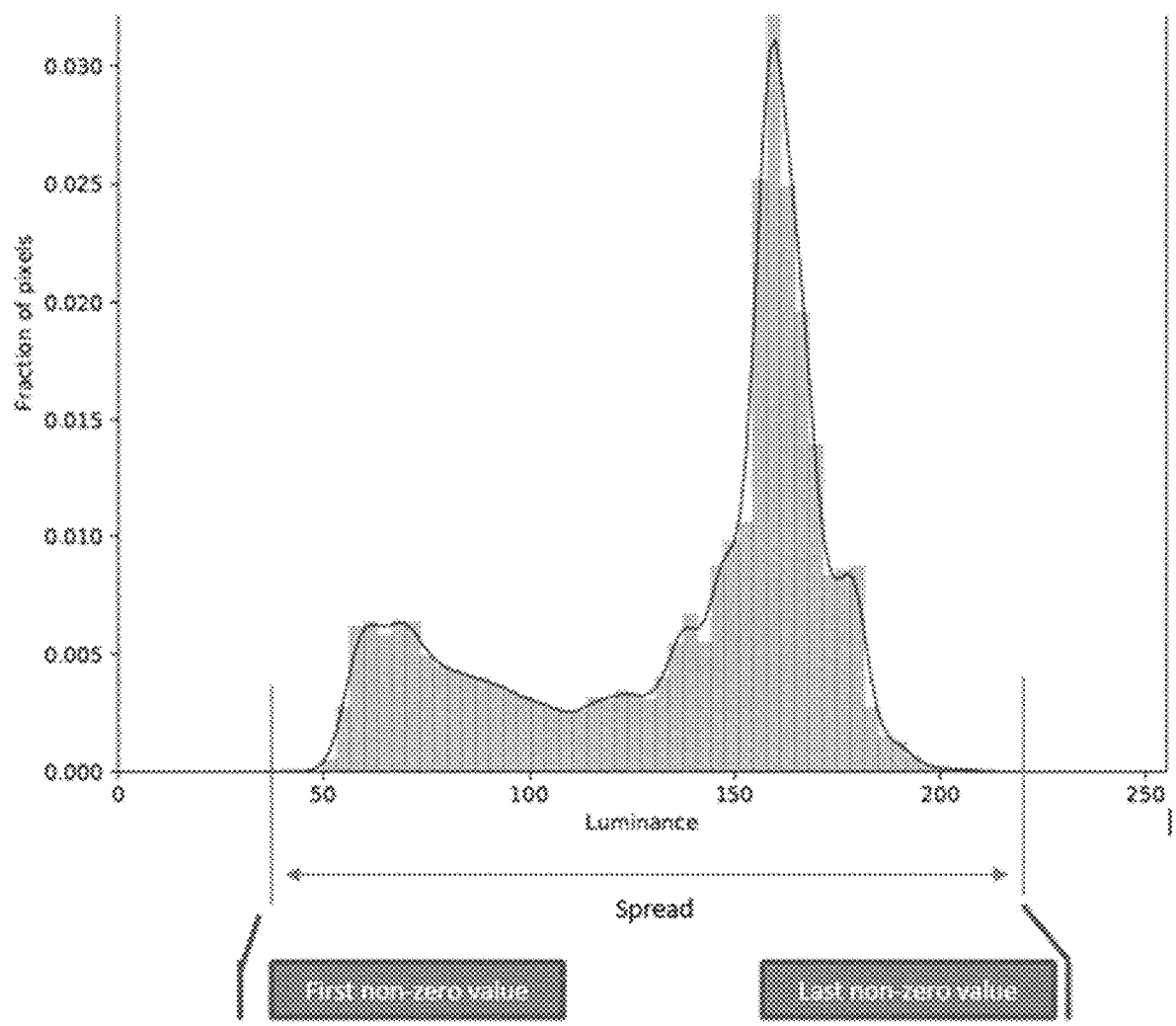
FIG. 4 is a graphical depiction of the spread feature calculated according to the present disclosure.

Step 104 determines, from the calculated distribution, a spread feature representing a series pixel values including at least a predetermined number of pixels at each pixel value in the series of pixel values spread feature is calculated in order to help the model distinguish between classes. The processing according to step 104 is illustrated in FIG. 4. As shown therein, there are certain fraction of pixels at unique pixel locations which are continuous and show values beginning at pixel location 50 and ending at substantially 200. Additional details regarding execution depicted in Table 6.

TABLE 1

Scaled Data Frame
Fraction of Total Pixels

| pixel_value_0 | pixel_value_1 | pixel_value_2 | ... | pixel_value_253 | pixel_value_254 | pixel_value_255 |
|---|---|---|---|---|---|---|
| 0.000000e+00 | 0.000000e+00 | 0.000000e+00 | ... | 0.000000 | 0.000000 | 0.000000 |
| 6.890681e-02 | 3.555594e-02 | 2.134022e-02 | ... | 0.009368 | 0.009233 | 0.030087 |
| 9.960000e-08 | 9.960000e-08 | 6.640000e-08 | ... | 0.005160 | 0.006148 | 0.112897 |
| 0.000000e+00 | 0.000000e+00 | 0.000000e+00 | ... | 0.000000 | 0.000000 | 0.000000 |
| 1.271182e-01 | 8.999173e-02 | 2.035927e-02 | ... | 0.015983 | 0.030888 | .0221306 |

Pseudo code below in Table 2 reads image in and creates a row of normalized input that can be appended into a dataframe as shown in Table 1.

TABLE 2

Pseudocode for Generating Normalized Data Frame in Table 1

```
import matplotlib.pyplot as plt
import scipy.ndimage as ndi
img = plt.imread('00b01c5b231e0853.jpg')
if len(img.shape) > 2:
    luminance = img.astype(float).dot([0.2126, 0.7152, 0.0722])
    hist = ndi.histogram(luminance, min = 0, max=255, bins=256 )
    pdf = hist/hist.sum( )
    pdf_list = pdf.tolist( )
else:
    hist = ndi.histogram(img, min = 0, max=255, bins=256 )
    pdf = hist/hist.sum( )
    pdf_list = pdf.tolist( )
```

To obtain the normalized scaled row of data which will be evaluated and used to classify the image into one of the three categories, a matrix representing luminance at each pixel value is obtained. For example, if the original image size is 1000×1000 pixels and the original image was a color image having red, green and blue channels, a three layer matrix will be extracted from the image where each layer represents a respective color channel matrix in the image and has 1000 rows and 1000 columns each cell representing pixel values. Then luminance matrix is produced as described hereinabove.

Thereafter, the luminance matrix is flattened into a row of data i depicting probability density function distribution of luminance values at each pixel value (ranges from 0-255). Such intermediary dataframe is shown in Table 3 and includes a a table where each column reflects how much out of all image pixels is occupied by each pixel value from 0-255 and each row represents one image. As such, the values in each row represent different images input into the algorithm illustrating the powerful batch processing and contrast evaluation provided by this algorithm.

TABLE 3

Intermediary Dataframe

| pixel_value_5 | pixel_value_6 | pixel_value_7 | pixel_value_8 | pixel_value_9 | ... | pixel_value_248 | pixel_value_249 | pixel_value_250 | pixel_value_251 | pixel_value_252 |
|---|---|---|---|---|---|---|---|---|---|---|
| 0.000000e+00 | 0.000000 | 0.000000 | 0.000000 | 0.000000 | ... | 0.000000 | 0.000000 | 0.000000 | 0.000000 | 0.000000 |
| 0.000000e+00 | 0.000000 | 0.000000 | 0.000000 | 0.000000 | ... | 0.000000 | 0.000000 | 0.000000 | 0.000000 | 0.000000 |
| 0.000000e+00 | 0.000000 | 0.000000 | 0.000000 | 0.000000 | ... | 0.000000 | 0.000000 | 0.000000 | 0.000000 | 0.000000 |
| 0.000000e+00 | 0.000000 | 0.000000 | 0.000000 | 0.000000 | ... | 0.000000 | 0.000000 | 0.000000 | 0.000000 | 0.000000 |
| 0.000000e+00 | 0.000000 | 0.000000 | 0.000000 | 0.000000 | ... | 0.000000 | 0.000000 | 0.000000 | 0.000000 | 0.000000 |
| ... | ... | ... | ... | ... | ... | ... | ... | ... | ... | ... |
| 0.000000e+00 | 0.000000 | 0.000000 | 0.000000 | 0.000000 | ... | 0.000000 | 0.000000 | 0.000000 | 0.000000 | 0.000000 |
| 1.430129e−02 | 0.007498 | 0.009434 | 0.006094 | 0.005240 | ... | 0.001662 | 0.002206 | 0.003236 | 0.003333 | 0.004350 |
| 8.640000e−07 | 0.000025 | 0.000141 | 0.000465 | 0.000946 | ... | 0.004561 | 0.005771 | 0.005574 | 0.004390 | 0.003939 |
| 0.000000e+00 | 0.000000 | 0.000000 | 0.000000 | 0.000000 | ... | 0.000000 | 0.000000 | 0.000000 | 0.000000 | 0.000000 |
| 4.956021e−03 | 0.004077 | 0.002807 | 0.004215 | 0.002489 | ... | 0.002259 | 0.001176 | 0.002542 | 0.002717 | 0.002721 |

In order to create spread feature, using the intermediary values shown in Table 3, a data frame mask is calculated by utilizing pre-built method mask, with condition set to 0, meaning that all 0 values in the data frame will be turned into NaN values. The result of this masked processing is illustrated in Table 4.

TABLE 4

Masked Dataframe

| pixel_value_5 | pixel_value_6 | pixel_value_7 | pixel_value_8 | pixel_value_9 | ... | pixel_value_248 | pixel_value_249 | pixel_value_250 | pixel_value_251 | pixel_value_252 |
|---|---|---|---|---|---|---|---|---|---|---|
| NaN | NaN | NaN | NaN | NaN | ... | NaN | NaN | NaN | NaN | NaN |
| NaN | NaN | NaN | NaN | NaN | ... | NaN | NaN | NaN | NaN | NaN |
| NaN | NaN | NaN | NaN | NaN | ... | NaN | NaN | NaN | NaN | NaN |
| NaN | NaN | NaN | NaN | NaN | ... | NaN | NaN | NaN | NaN | NaN |
| NaN | NaN | NaN | NaN | NaN | ... | NaN | NaN | NaN | NaN | NaN |
| ... | ... | ... | ... | ... | ... | ... | ... | ... | ... | ... |
| NaN | NaN | NaN | NaN | NaN | ... | NaN | NaN | NaN | NaN | NaN |
| 1.430129e-02 | 0.007498 | 0.009434 | 0.006094 | 0.005240 | ... | 0.001662 | 0.002206 | 0.003236 | 0.003333 | 0.004350 |
| 8.640000e-07 | 0.000025 | 0.000141 | 0.000465 | 0.000946 | ... | 0.004561 | 0.005771 | 0.005574 | 0.004390 | 0.003939 |
| NaN | NaN | NaN | NaN | NaN | ... | NaN | NaN | NaN | NaN | NaN |
| 4.956021e-03 | 0.004077 | 0.002807 | 0.004215 | 0.002489 | ... | 0.002259 | 0.001176 | 0.002542 | 0.002717 | 0.002721 |

Next, indexing is performed on the masked data frame of Table 4 which utilizes first_valid_index, last_valid_index value labels to yield a result first and last column names per row of data that have a non-NaN values. These are processed and passed as new columns depicting first and last non zero value columns per data row, even in cases where there are zero value columns in between non zero value columns as shown in Table 5:

TABLE 5

Spread Values

| pixel_value_0 | pixel_value_104 | pixel_value_105 | ... | pixel_value_140 | pixel_value_141 | start | finish |
|---|---|---|---|---|---|---|---|
| NaN | NaN | 3.85E−08 | ... | 3.85E−08 | NaN | pixel_value_105 | pixel_value_140 |

Column names (and associated text) are removed and only column name numerical pixel values remain so that the spread can be calculated, for each row, by subtracting the maximum value and the minimum value. Thereafter, the data is scaled a scale from 0 to 1 using, for example, the following pseudocode shown in Table 6 which ultimately results in the dataframe shown in Table 1 above.

TABLE 6

Psuedocode for Scaling Processing

```
from sklearn.preprocessing import MinMaxScaler
import pandas as pd
df_mask = df_min_max.mask(df_min_max == 0)
df_min_max = df_min_max.assign(
start=df_mask.apply(pd.Series.first_valid_index, 1),
finish=df_mask.apply(pd.Series.last_valid_index, 1)
)
df_min_max.start = [x[12:] for x in df_min_max.start]
df_min_max.finish = [x[12:] for x in df_min_max.finish]
df["start"] = df_min_max.start
df["finish"] = df_min_max.finish
# do distance
df["spread"] = df.finish − df.start
# scaler for spread
scaler1 = MinMaxScaler(feature_range=(0, 1))
scaler1.fit(df.spread.values.reshape(−1, 1))
df["spread_scaled"] = scaler1.transform(df.spread.values.reshape(−1, 1))
```

In Step 105, the resulted output (data frame) is fed into a pre-trained model, which was trained using a training dataset set up as a 3-class classification problem, which returns probabilities of an image/input being in each class. Probabilities of 3 classes add up to 1 (100%). The model used is an optimized distributed gradient boosting library designed to be highly efficient, flexible and portable. It implements machine-learning algorithms under the Gradient Boosting framework. The model provides a parallel tree boosting (also known as GBDT, GBM) that solve many data science problems in a fast and accurate way. In one embodiment, an example of the trained model used is XBoost. An example of the model structure and the rationale for designing as such is shown in FIGS. 5A-5D.

As shown in FIG. 5A, the model includes 82 estimators through which the dataframe values are processed in order to determine a prediction value indicative of a particular one of the three classes. For example, each of the 82 estimators/trees includes a series of binary classifications beginning a respective pixel value and determines if, at that value, the fraction of pixels is one of greater or less than a threshold. At each stage of the estimator, the result then considers different binary classifications at either the same but more likely, different value to see if the next value meets the threshold until all stages of all estimators are completed to yield final leaf values that are then used for calculation representative of a likelihood that the image, based on the evaluations performed by the estimators, is a high contrast image, a normal contrast image or a low contrast image. In this particular case all final leaf values from all estimators are summed up by class, bias is added and then multi-class softmax function is applied to get probabilities by class. Equations 2A-2C show how class probabilities would be calculated with this process repeated for each class and components of equation changed based on class under evaluation:

Class 1 probability=exp(sum of class 1 leafs)/(exp (sum of class 1 leafs)+exp(sum of class 2 leafs)+exp(sum of class 3 leafs))     (Equation 2A)

Class 2 probability=exp(sum of class 2 leafs)/(exp (sum of class 1 leafs)+exp(sum of class 2 leafs)+exp(sum of class 3 leafs))     (Equation 2B)

Class 3 probability=exp(sum of class 3 leafs)/(exp (sum of class 1 leafs)+exp(sum of class 2 leafs)+exp(sum of class 3 leafs))     (Equation 2C)

Figure 5B:
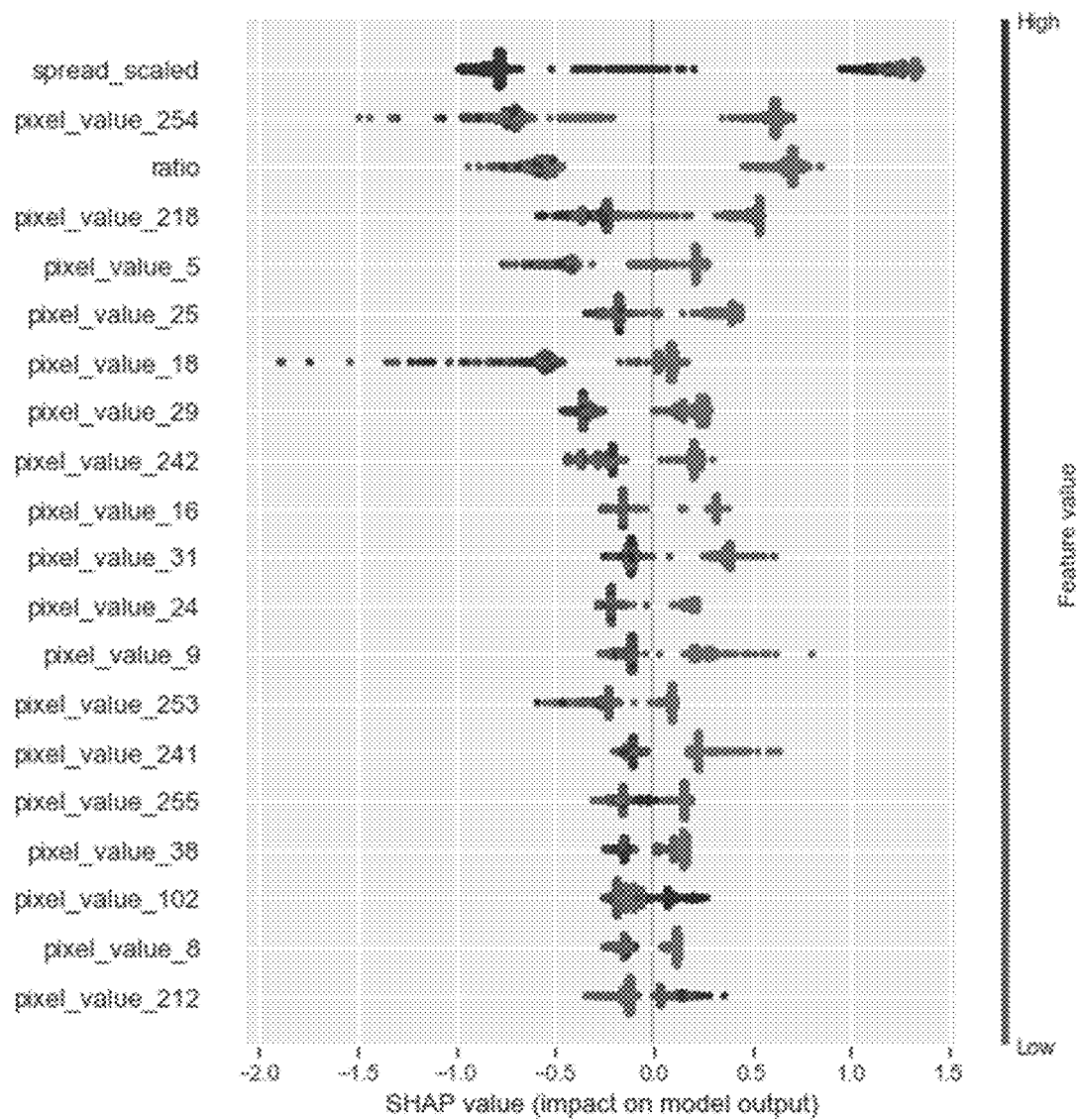
Figure 5C:
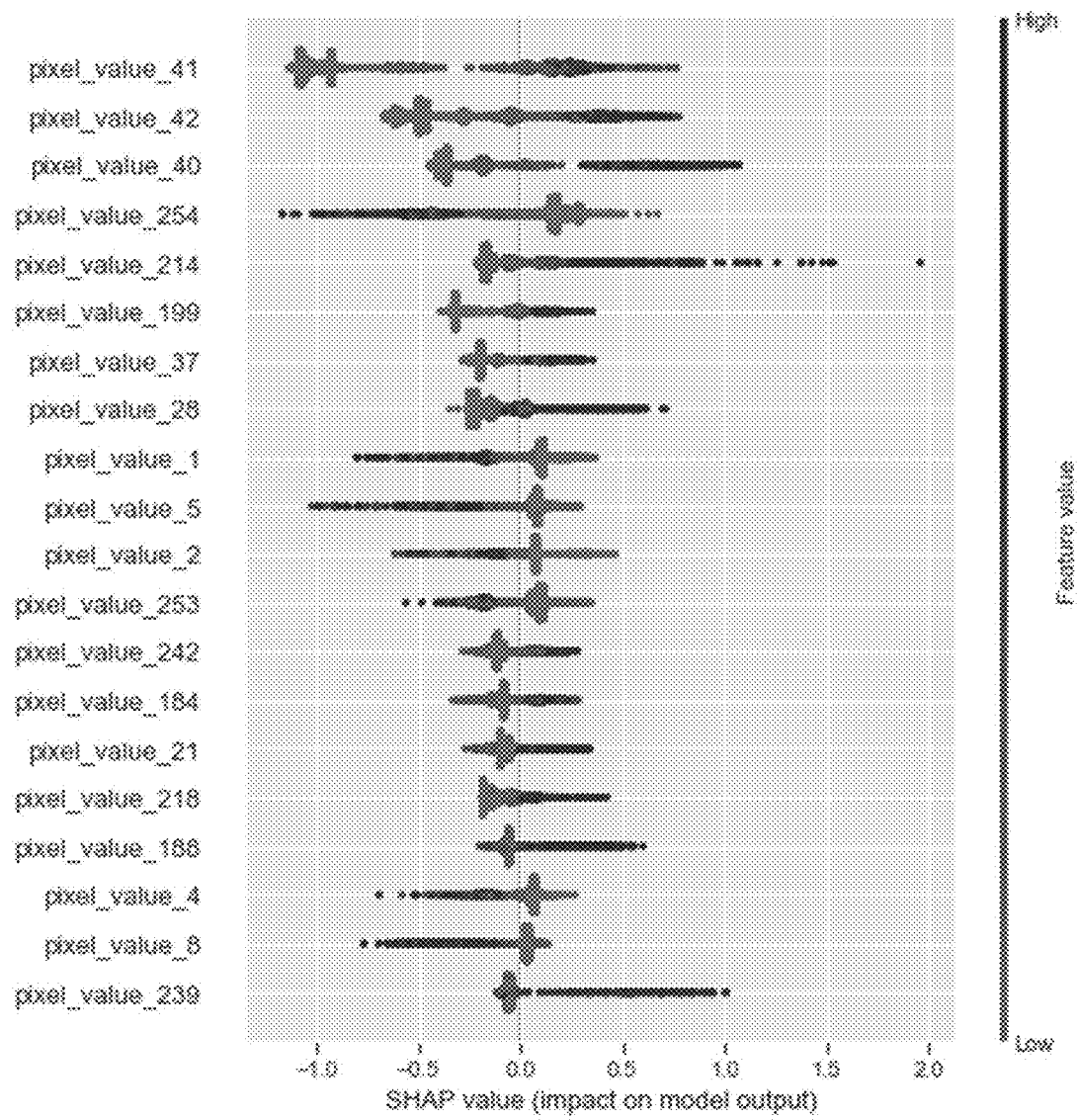
Figure 5D:
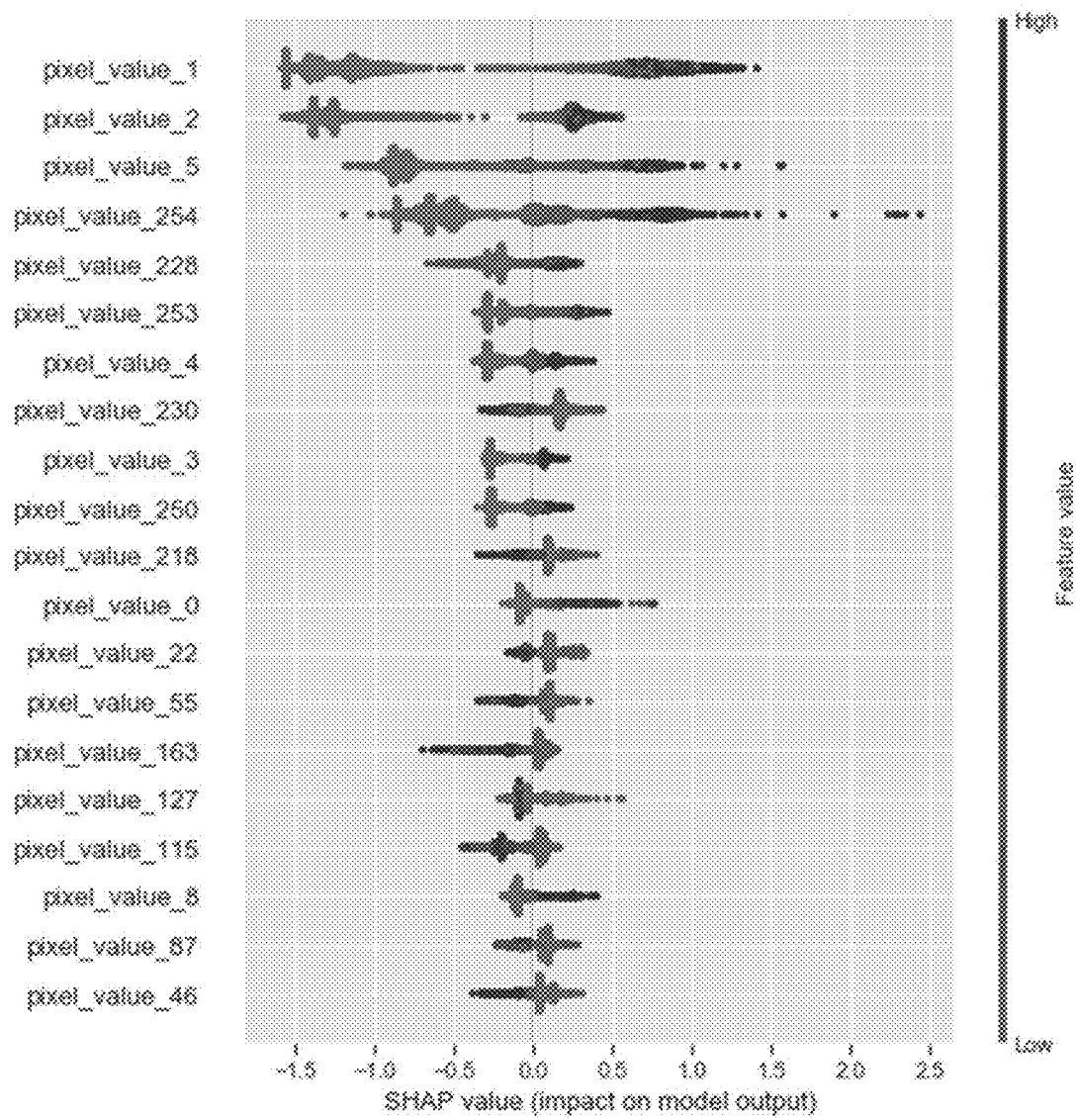

Further structure of the model and in particular evaluation of importance of each feature (column) on prediction by class is considered based on the evaluation of SHAP values graphs shown in FIG. 5B-5D which illustrate importance of each feature for predicting a class. FIG. 5B illustrates SHAP values for that provide powerful predictive values indicative of low contrast images. FIG. 5C illustrates SHAP values for that provide powerful predictive values indicative of normal contrast images. FIG. 5D illustrates SHAP values for that provide powerful predictive values indicative of high contrast images. For each of these graphs, the higher the location on the Y axis indicates the greater predictive power that a values at the particular pixel values would be indicative of the particular class. Note that scaled spread ranks #1 for low contrast class.

In some instances, users may want to obtain a continuous value for their convenience such as that values near 0 map to low contrast, values near 1 map to high contrast and values near 0.5 map to normal contrast.

After processing by the trained model, below sample outputs are recalibrated into 0-1 range in step 107 as explained above. An example of the recalibration processing of 107 is shown in Table 7 which illustrates a dataframe output from the model for 5 images each having 3 classes and corresponding probabilities adding up to 1, from low to high contrast.

TABLE 7

Sample Model Output

| base | high | low |
|---|---|---|
| 0.999944 | 0.000031 | 0.000025 |
| 0.998729 | 0.001252 | 0.000019 |

TABLE 7-continued

Sample Model Output

| base | high | low |
|---|---|---|
| 0.997761 | 0.001453 | 0.000786 |
| 0.988485 | 0.011083 | 0.000432 |
| 0.999947 | 0.000042 | 0.000011 |

TABLE 8

Pseudocode for Calculating Class Probability

New_label = [ ]
for i in df.values.tolist( ):
    New_label.append((i[1]+(1−i[2]))/2)

The pseudocode in Table 8 converts resulting dataframe into a list of lists that contain values each representing probability prediction of an instance belonging to one of 3 classes shown in Table 9.

TABLE 9

Prediction Instances

| 0 = normal contrast | 1 = high contrast | 2 = low contrast |
|---|---|---|
| [[0.9999442100524902, | 3.0616338335676126e−05, | 2.519647023291327e−05], |
| [0.9987286925315856, | 0.0012523571494966743, | 1.8885681129177104e−05], |
| [0.997760534286499, | 0.0014531713677570224, | 0.0007863088976591825], |
| [0.9884853363037108, | 0.011082837358117105, | 0.00043184874812141066], |
| [0.999947428703308, | 4.1644983866717666e−05, | 1.0970878065563737e−05], |
| [0.9721248149871826, | 0.027737423777580258, | 0.00013771267549600452], |
| [0.9978803396224976, | 0.0019185537239536645, | 0.0002011046017287299], |

According to Table 8, an empty variable is generated which serves for capturing reclassification of the three class outputs into a single value between 0 and 1.

In one embodiment, each element of Table 8 is compared to the other elements in the list to the other element in list. When element 1 (high contrast class probability) is greater than element 0 (normal contrast class probability) and greater than element 2 (low contrast class probability) then 1 (high contrast label) is appended. When element 2 is greater than element 0 and greater than element 1 then 0 (low contrast label) is appended. In all other cases 0.5 (normal contrast label) is appended.

In another embodiment, the following calculation ((i[1]+(1−i[2]))/2) which depicts mean of probability of high contrast+inverse of the probability of low class is executed per row or instance is calculated. In this calculation i[1] is the high contrast probability and i[2] is the low contrast probability. An exemplary output and result are shown in Table 10.

TABLE 10

Examples of output probabilities remapped

| base | high | low |
|---|---|---|
| 0.999944 | 0.000031 | 0.000025 |
| 1) (0.000031 + (1 − 0.000025))/2 = 0.500003 | | |
| 0.000031 | 0.999944 | 0.000025 |
| 1) (0.999944 + (1 − 0.000025))/2 = 0.999488 | | |

The result of the contrast scoring algorithm described above yields a highly accurate and reliable classification of images into the correct contrast class. This can be seen in evaluation of predictions on hold out pre labeled dataset in FIG. 6B which represents a confusion matrix that indicates the accuracy of the contrast scoring algorithm with various ranges of accuracies at or above 95%.

Figure 3A:
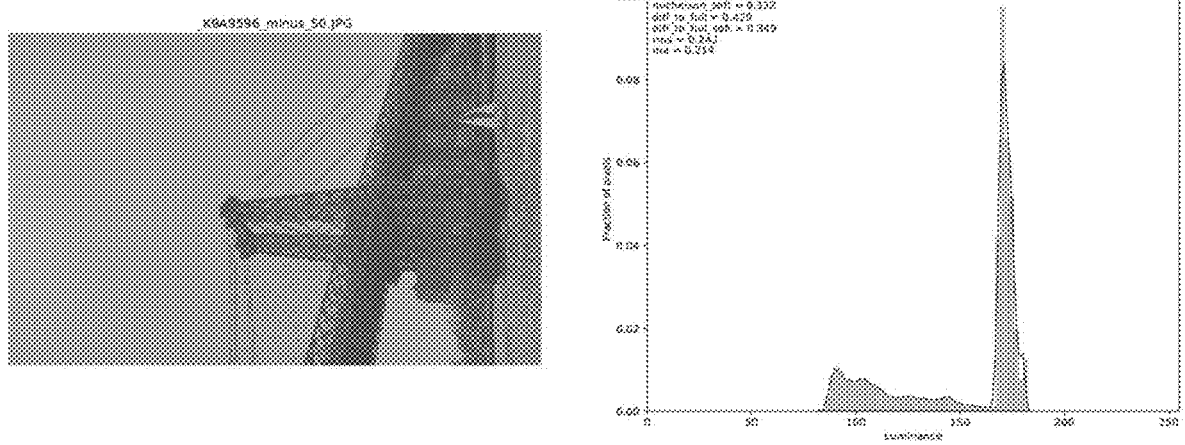
FIG. 3A-3C illustrate exemplary images classified according to the algorithm of FIG. 2.
Figure 3B:
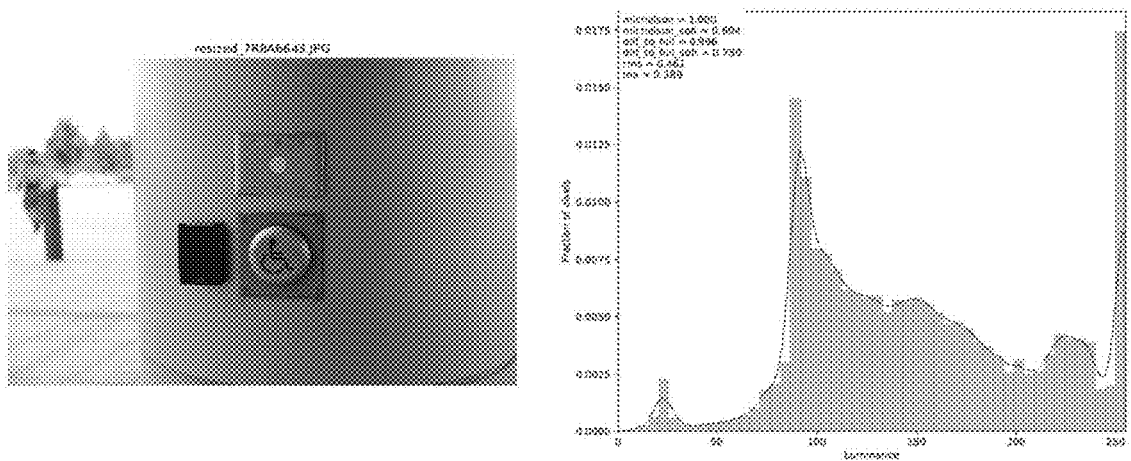
Figure 3C:
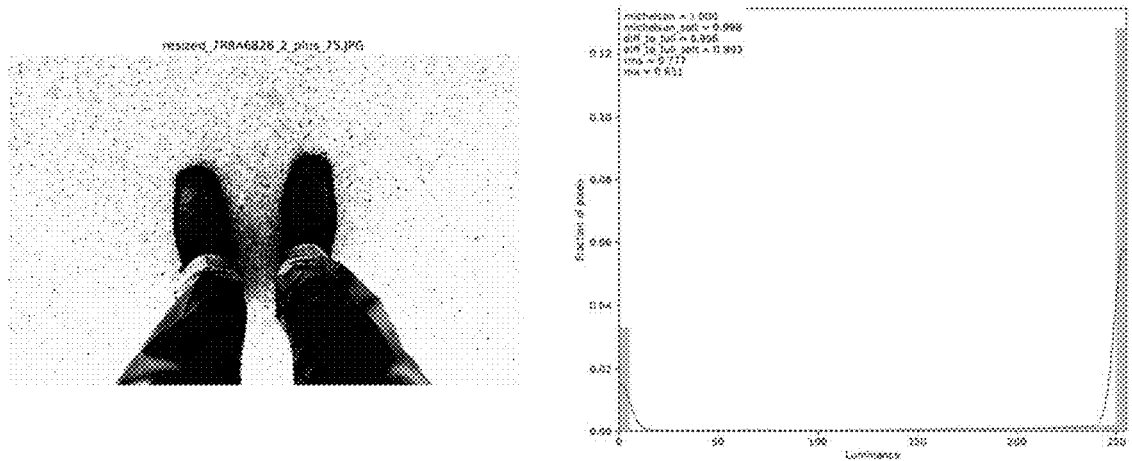

Additionally inconsistent samples of prediction from previously mentioned methods illustrated in FIG. 1 be seen when looking at FIGS. 3A-3C. With FIG. 3A representing low contrast image, FIG. 3B representing normal contrast image and FIG. 3C representing high contrast image, scores for each from each algorithm are listed to the right in the left upper corner of luminance distribution values.

Figure 6A:
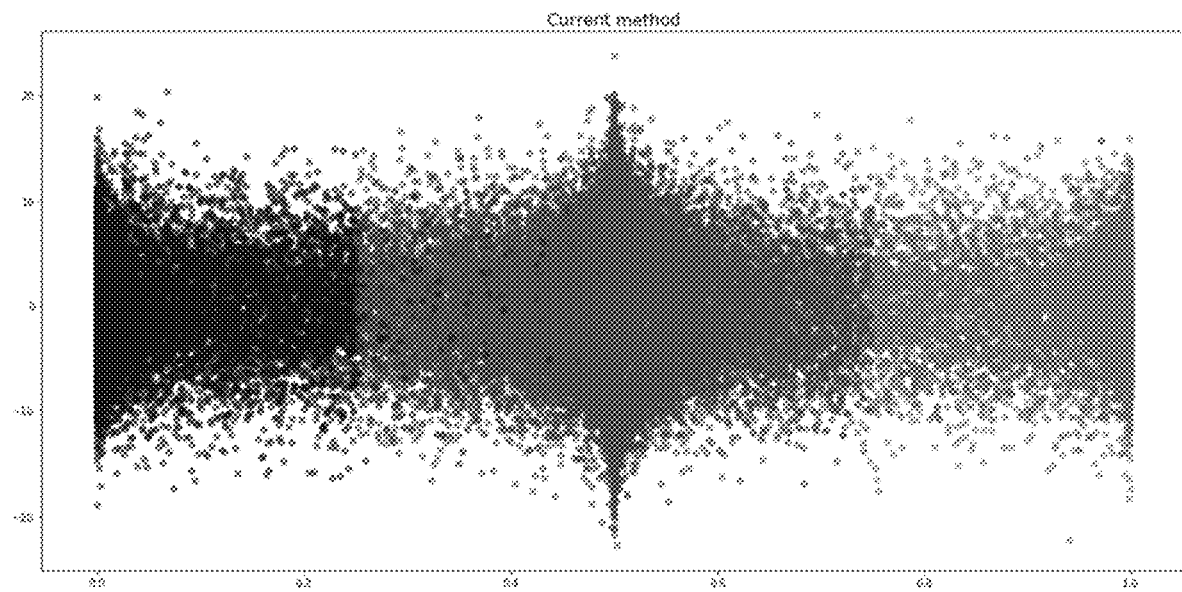
FIGS. 6A & 6B illustrate a quantitative evaluation of the algorithm for evaluating image contrast according to the present disclosure.
Figure 6B:
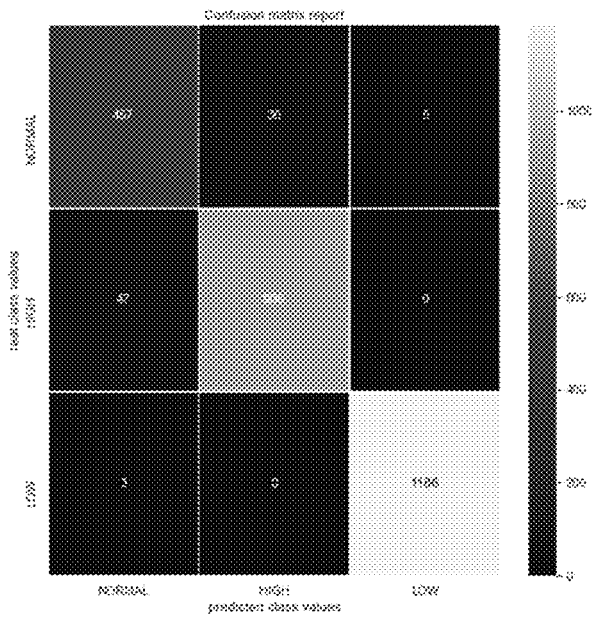
Figure 7A:
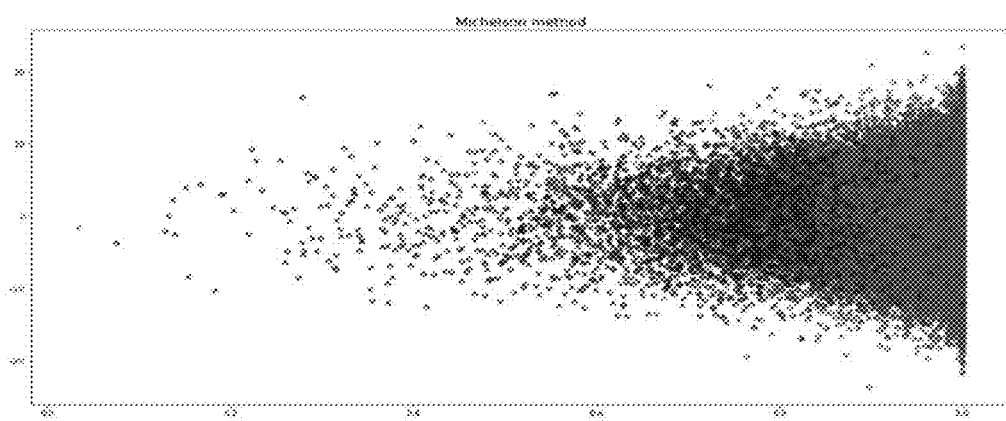
FIGS. 7A-7F illustrate class segmentation according to the prior art classification methods shown in FIG. 1.
Figure 7B:
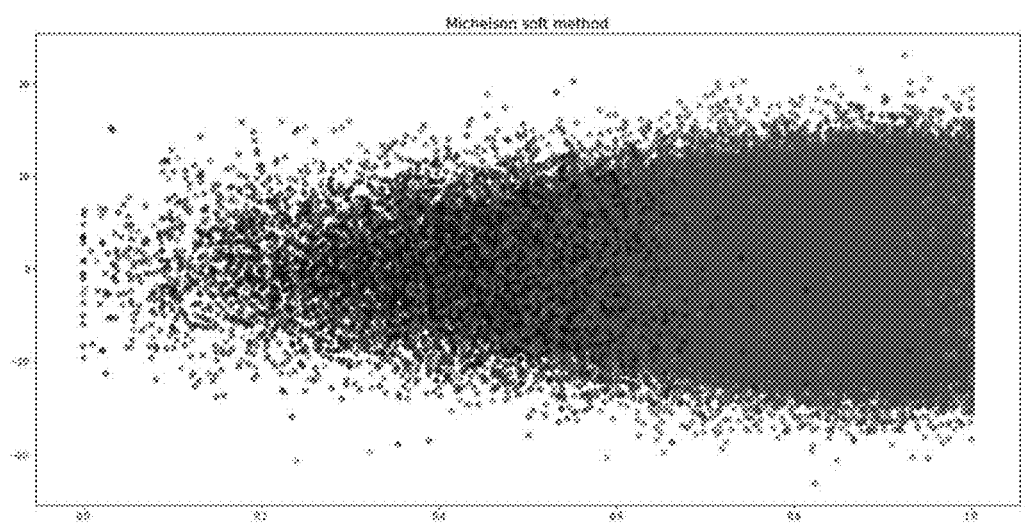
Figure 7C:
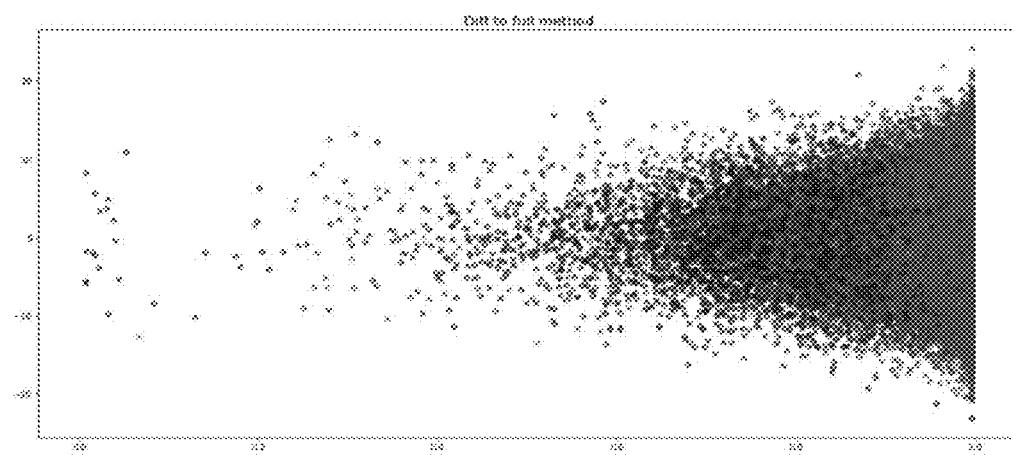
Figure 7D:
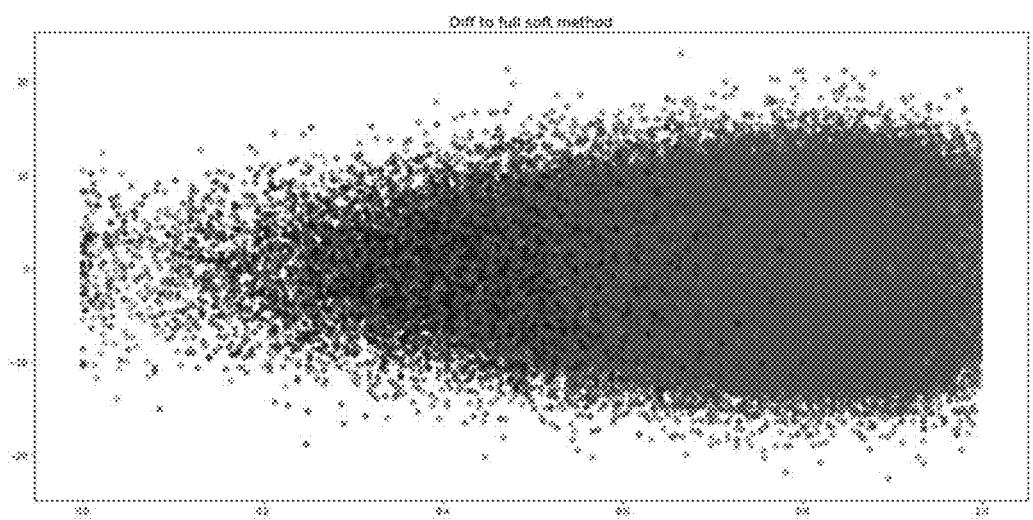
Figure 7E:
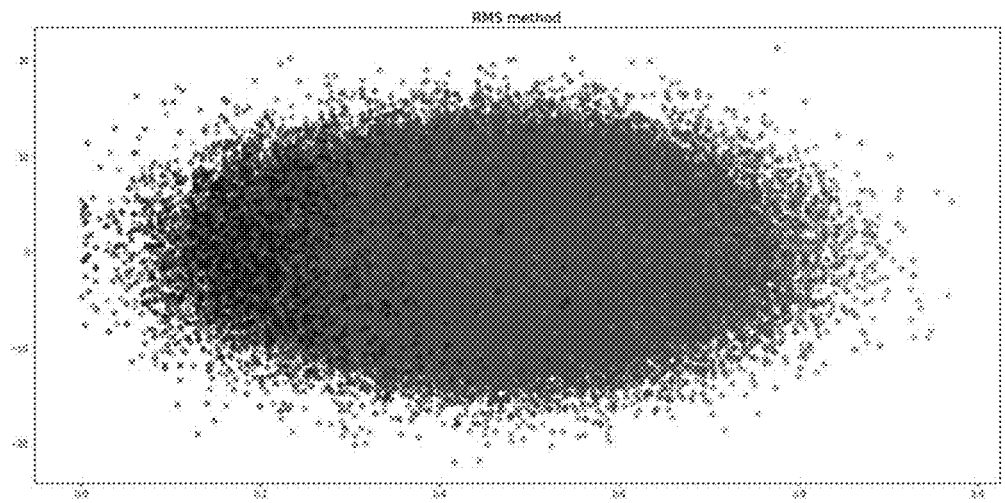
Figure 7F:
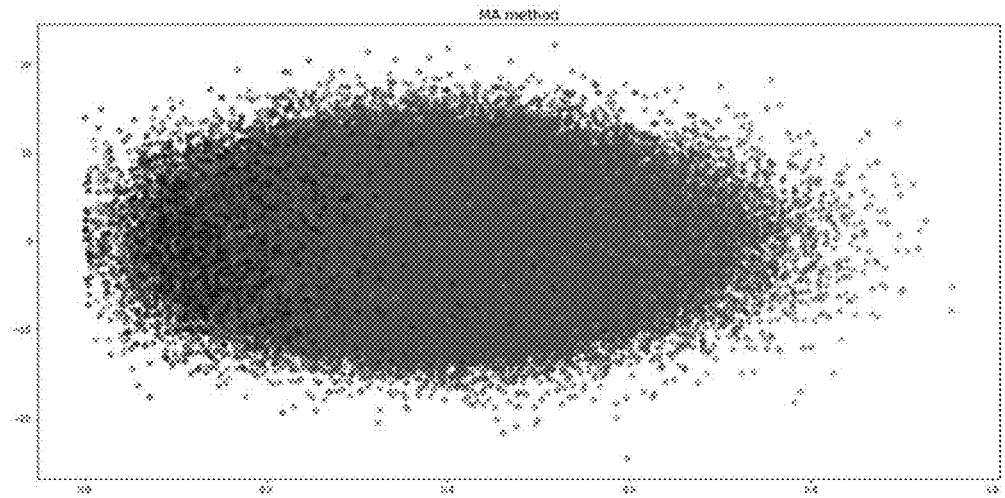
Figure 8:
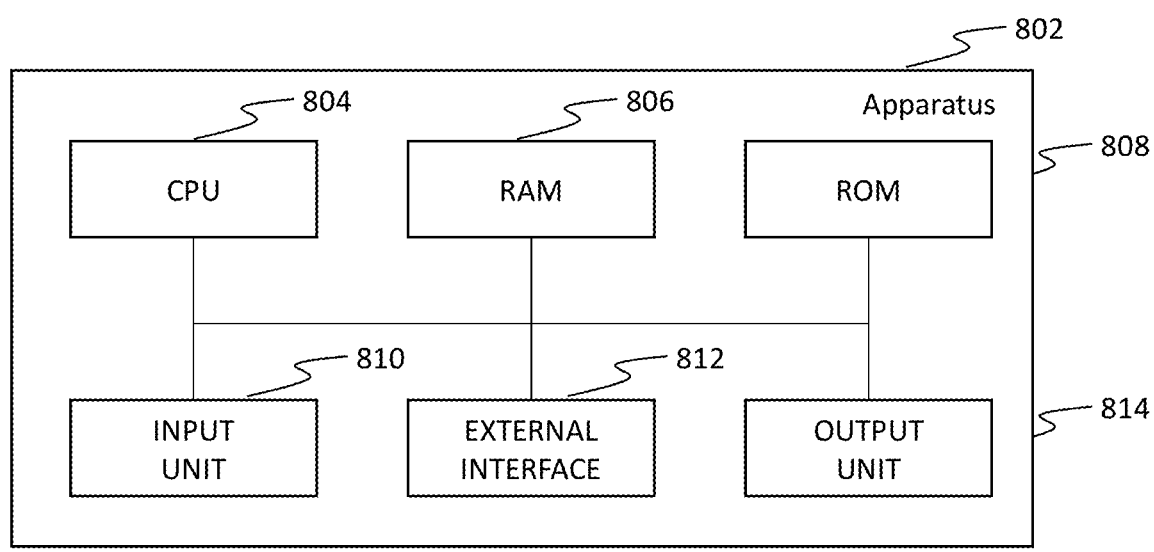
FIG. 8 is a block diagram of hardware used to implement the algorithm according to the present disclosure.

The improvement in classifying images according to the algorithms of FIG. 1 is also clearly illustrated when looking at the graphical depiction in FIG. 6A which shows a clear separation of classification determinations for balanced number of images for each class when compared to the prior art algorithms in FIG. 1. When a same set of image data is classified and scored to assign a contrast value using the algorithm according to the present disclosure, the result is a clear separation of classes representing a higher probability that the image classified in that class actually belongs to that class. Compare the separation shown in FIG. 8 which illustrates three clear classes with the separation generated using the various method of FIG. 1 which are shown in FIGS. 7A-7F which each correspond to an algorithm in FIG. 1. In each of FIGS. 7A-7F, there is an undefined bunching of classifications which do not allow for reliable determination that the classification provided therein is actually indicative of the class to which it was predicted to be in. The further accuracy and improvement provided by the contrast scoring algorithm of the present disclosure is shown in FIG. 6B which represents a confusion matrix that indicates the accuracy of the contrast scoring algorithm according to the present disclosure FIG. 8 illustrates the hardware of an apparatus that can be used in implementing the above described disclosure. The apparatus 802 includes a CPU 804, a RAM 806, a ROM 808, an input unit 810, an external interface 812, and an output unit 814. The CPU 804 controls the apparatus 802 by using a computer program (one or more series of stored instructions executable by the CPU) and data stored in the RAM 806 or ROM 808. Here, the apparatus may include one or more dedicated hardware or a graphics processing unit (GPU), which is different from the CPU 804, and the GPU or the dedicated hardware may perform a part of the processes by the CPU 804. As an example of the dedicated hardware, there are an application specific integrated circuit (ASIC), a field-programmable gate array (FPGA), and a digital signal processor (DSP), and the like. The RAM 806 temporarily stores the computer program or data read from the ROM 808, data supplied from outside via the external interface 812, and the like. The ROM 808 stores the computer program and data which do not need to be modified and which can control the base operation of the apparatus. The input unit 810 is composed of, for example, a joystick, a jog dial, a touch panel, a keyboard, a mouse, or the like, and receives user's operation, and inputs various instructions to the CPU 804. The external interface 812 communicates with external device such as PC, smartphone, camera and the like. The communication with the external devices may be performed by wire using a local area network (LAN) cable, a serial digital interface (SDI) cable, WIFI connection or the like, or may be performed wirelessly via an antenna. The output unit 814 is composed of, for example, a display unit such as a display and a sound output unit such as a speaker, and displays a graphical user interface (GUI) and outputs a guiding sound so that the user can operate the apparatus as needed.

The scope of the present invention includes a non-transitory computer-readable medium storing instructions that, when executed by one or more processors, cause the one or more processors to perform one or more embodiments of the invention described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

The use of the terms "a" and "an" and "the" and similar referents in the context of this disclosure describing one or more aspects of the invention (especially in the context of the following claims) arc to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter disclosed herein and does not pose a limitation on the scope of any invention derived from the disclosure unless otherwise claimed. No language in the specification should be construed as indicating any non-claimed element as essential.

It will be appreciated that the instant disclosure can be incorporated in the form of a variety of embodiments, only a few of which are disclosed herein. Variations of those embodiments may become apparent to those of ordinary skill in the art upon reading the foregoing description. Accordingly, this disclosure and any invention derived therefrom includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method of classifying a contrast level of an image, the method comprising:

obtaining an image from an image source;

extracting intensity values for each pixel of the obtained image;

calculating a probability distribution for the obtained image representing a number of pixels at each unique pixel value;

determining, from the calculated probability distribution, a spread value representing a series pixel values including at least a predetermined number of pixels at each pixel value in the series of pixel values;

classifying the obtained image into a member of one of three classes by predicting, via a trained machine learning model having been trained using the calculated probability distribution and the determined spread value to predict which of the three classes the image belongs, generating, for each of the three classes, a likelihood value representing a likelihood that the obtained image belongs in that class and, classifying the obtained image into the one of the three classes based on the likelihood value meeting a predetermined threshold associated with the one of the three classes.

2. The method according to claim 1, further comprising:

determining a number of channels within the obtained image, and wherein the probability distribution is calculated using pixels values in each of the determined number of channels.

3. The method according to claim 2, further comprising:

determining, in a case where the determined number of channels is greater than a predetermined number of channels, a luminance value for each pixel at each of the determined number of channels.

4. The method according to claim 1, further comprising:

scaling the determined spread value to represent a percentage of pixel values among all possible pixel values within the spread; and generating a data frame including the probability distribution and the scaled spread value.

5. The method according to claim 1, wherein classifying the obtained image further comprises:

generating a data frame including the calculated probability distribution and the determined spread value;

providing the generated data frame to a trained machine learning model trained to predict, based on the generated data frame, which one of the three classes the image belongs.

6. The method according to claim 1, wherein classifying the obtained image includes:

classifying the obtained image in a first class when a likelihood value for the first class is greater than a likelihood value for each of the second and third classes;

classifying the obtained image in a second class when a likelihood value for the second class is greater than a likelihood value for each of the first class and the third class; and classifying the obtained image in the third class in all other instances.

7. The method according to claim 6, wherein
the first class represents an image having a high degree of contrast;
the second class represents an image having a low degree contrast; and
the third class represents an image having a normal degree contrast.

8. An apparatus configured to classify a contrast level of an image comprising:
one or more memories storing instructions; and
one or more processors that, upon execution of the stored instructions, configure the one or more processors to:
obtain an image from an image source;
extract intensity values for each pixel of the obtained image;
calculate a probability distribution for the obtained image representing a number of pixels at each unique pixel value;
determine, from the calculated probability distribution, a spread value representing a series pixel values including at least a predetermined number of pixels at each pixel value in the series of pixel values; and
classify the obtained image into a member of one of three classes by
predicting, via a trained machine learning model having been trained using the calculated probability distribution and the determined spread value to predict which of the three classes the image belongs,
generating, for each of the three classes, a likelihood value representing a likelihood that the obtained image belongs in that class and,
classifying the obtained image into the one of the three classes based on the likelihood value meeting a predetermined threshold associated with the one of the three classes.

9. The apparatus according to claim 8, wherein execution of the stored instructions further configures the one or more processors to:
determine a number of channels within the obtained image, and
wherein the probability distribution is calculated using pixels values in each of the determined number of channels.

10. The apparatus according to claim 9, wherein execution of the stored instructions further configures the one or more processors to:
determine, in a case where the determined number of channels is greater than a predetermined number of channels, a luminance value for each pixel at each of the determined number of channels.

11. The apparatus according to claim 8, wherein execution of the stored instructions further configures the one or more processors to:
scale the determined spread value to represent a percentage of pixel values among all possible pixel values within the spread; and
generate a data frame including the probability distribution and the scaled spread value.

12. The apparatus according to claim 8, wherein execution of the stored instructions further configures the one or more processors to:
generate a data frame including the calculated probability distribution and the determined spread value;
provide the generated data frame to a trained machine learning model trained to predict, based on the generated data frame, which one of the three classes the image belongs.

13. The apparatus according to claim 8, wherein
the obtained image is classified in a first class when a likelihood value for the first class is greater than a likelihood value for each of the second and third classes;
the obtained image is classified in a second class when a likelihood value for the second class is greater than a likelihood value for each of the first class and the third class; and
the obtained image is classified in the third class in all other instances.

14. The apparatus according to claim 13, wherein
the first class represents an image having a high degree of contrast;
the second class represents an image having a low degree contrast; and
the third class represents an image having a normal degree contrast.

* * * * *